United States Patent
Han

(10) Patent No.: US 8,169,416 B2
(45) Date of Patent: May 1, 2012

(54) CAPACITIVE TOUCH SCREEN

(75) Inventor: Sang-Youl Han, Seoul (KR)

(73) Assignee: Hi-Dis Touchscreen Co., Ltd., Seoul (KR)

( * ) Notice: Subject to any disclaimer, the term of this patent is extended or adjusted under 35 U.S.C. 154(b) by 0 days.

(21) Appl. No.: 12/888,152

(22) Filed: Sep. 22, 2010

(65) Prior Publication Data

US 2011/0025631 A1 Feb. 3, 2011

Related U.S. Application Data

(63) Continuation of application No. PCT/KR2008/007394, filed on Dec. 12, 2008.

(30) Foreign Application Priority Data

Apr. 2, 2008 (KR) .................. 10-2008-0030902

(51) Int. Cl.
*G06F 3/041* (2006.01)

(52) U.S. Cl. ........ 345/173; 345/174; 345/175; 345/176; 345/177

(58) Field of Classification Search .......... 345/156–179; 178/18.01, 19.01, 20.01
See application file for complete search history.

(56) References Cited

U.S. PATENT DOCUMENTS

| 7,355,592 | B2* | 4/2008 | Hong et al. | 345/173 |
| 8,111,245 | B2* | 2/2012 | Jiang et al. | 345/173 |
| 2002/0149571 | A1 | 10/2002 | Roberts | |
| 2005/0280635 | A1* | 12/2005 | Hinata | 345/173 |
| 2006/0138574 | A1* | 6/2006 | Saito et al. | 257/417 |
| 2008/0316182 | A1* | 12/2008 | Antila et al. | 345/173 |

FOREIGN PATENT DOCUMENTS

| KR | 2001-0091312 | 10/2001 |
| KR | 10-2003-0049646 | 6/2003 |
| KR | 10-2004-0031512 | 4/2004 |
| KR | 10-0661000 | 12/2006 |
| KR | 10-2007-0063353 | 6/2007 |
| KR | 10-0787834 | 12/2007 |
| KR | 10-2008-0075804 | 8/2008 |

* cited by examiner

*Primary Examiner* — Nitin Patel
*Assistant Examiner* — Mansour M Said
(74) *Attorney, Agent, or Firm* — Lowe Hauptman Ham & Berner LLP

(57) ABSTRACT

The present invention provides a capacitive touch screen (1) which includes a substrate (10), a first electrode plate (20), an elastic spacer (30), a second electrode plate (40) and a transparent panel (50). The substrate (10) is made of a plate having a rim (11). The first electrode plate (20) is placed on the rim (11) of the substrate (10). The elastic spacer (30) is interposed between the first electrode plate (20) and second electrode plate (40). One of the first and second electrode plates comprises four or more electrode plates arranged along the rim (11) of the substrate (10). When a pressure is applied to the transparent panel (50), a distance (d) between the first and second electrode plate changes. Thereby, capacitances are varied at sensing points (S) corresponding to locations of the four or more electrode plates, and a touch location and a touch pressure are determined by variation rates of the measured capacitances.

6 Claims, 6 Drawing Sheets

(A)

(B)

CAPACITIVE TOUCH SCREEN

The present application is based on, and claims priority from, Korean Application Number 10-2008-0030902 and is a continuation of International Application Number PCT/KR2008/007394, respectively filed on Apr. 2, 2008 and Dec. 12, 2008, the disclosure of which is hereby incorporated by reference herein in its entirety.

TECHNICAL FIELD

The present invention relates, in general, to touch screens and, more particularly, to a capacitive touch screen which is able to detect not only a touch location but also the intensity of touch pressure and enhance the visibility of images displayed on a display disposed below the screen and has a simple structure.

BACKGROUND ART

Generally, touch screens are widely used as monitors in various kinds devices, such as navigators, industrial terminals, notebook computers, automatic teller machines, game machines, etc., and as input units of various electric and electronic devices including not only mobile terminals, such as mobile phones, MP3 players, PDA (Personal Digital Assistant)s, PMP (Portable Multimedia Player)s, PSP (Play Station Portable)s, Portable Game Players, DMB (Digital multimedia Broadcasting) receivers, etc., but also electric home appliances, such as refrigerators, microwave ovens, washing machines, etc.

As is well known, touch screens are typically used along with displays which display images. When a user touches a portion of the touch screen placed on top of the display with his/her finger or the like, an input signal corresponding to the content displayed on the display below the touched portion is input. Touch screens are classified according to structure or operating principle into resistive overlay touch screens, infrared touch screens, ultrasonic touch screens and capacitive touch screens.

The traditional capacitive touch screen is constructed such that electrode plates are placed on a substrate and voltage is applied to the electrode plates.

The capacitive touch screen operates according to the principle wherein when a conductive substance touches an electrode plate, parasitic capacitance in response to permittivity between the conductive substance and the electrode plate is measured, and coordinates of a touch location are determined by the measured parasitic capacitance. Compared to the resistive overlay touch screen, the visibility (transparency) and the durability are enhanced. However, such a capacitive touch screen responds only to a conductive substance, such as the finger of a human, which can generate parasitic capacitance. In addition, the precision is relatively low.

Meanwhile, a keypad having several dome switches arranged in a predetermined shape has been widely used as an input unit of a mobile terminal. Recently, products having touch screens as input units in place of dome switches have been developed and marketed.

According to the recent trend towards smallness of mobile terminals, distances between buttons of a keypad are being reduced. Hence, this has increased the probability of an error in manipulating the keypad, for example, in which when pushing a button, an adjacent button may be undesirably pushed. The use of a capacitive touch screen as an input unit mitigates the problem of an error in input operation due to a reduction in size of the mobile terminal.

However, the conventional capacitive touch screen for mobile phones determines only which electrode plate (or electrode) was touched with a finger of a user and generates a corresponding input signal. Therefore, the number of input signals which can be input by a single electrode are limited. In an effort to overcome the problems of the convent ional capacitive touch screen, the applicant of the present invention proposed 'Input unit for portable electronic device' disclosed in Korean Patent Registration No. 661,000 (issue date: Dec. 22, 2006).

The input unit of No. 661,000 can generate various input signals depending on the magnitude of capacitance which varies according to the intensity of touch pressure, rather than generating an input signal using parasitic capacitance generated by bringing a conductive substance such as a finger of the user into contact with electrode plates. Therefore, this input unit makes it possible to input various precise operations without causing an error.

As mentioned above, typically, touch screens are integrally used with displays. Various devices having touch screens and displays integrated with each other have been proposed. Representative examples were proposed in Korean Patent Registration No. 10-0493921, entitled 'Touch panel integrated with flat display' issue date: Jun. 10, 2005), Korean Patent Registration No. 10-0487355, entitled 'Electro-optical display integrated with touch panel' (issue date: May. 3, 2005), and Korean Patent Laid-open Publication No. 10-2001-0091312, entitled 'Display assembly integrated with touch panel' (publication date: Oct. 23, 2001).

These devices integrated with the touch screens are basically constructed such that a touch screen (or a touch pad) is placed on the upper surface of a display. Therefore, because the display is covered with the touch screen, the light transmissivity of the display is reduced. In other words, the amount of light emitted from the display is reduced because of passing through the touch screen. As a result, the visibility of images displayed on the display is deteriorated.

DISCLOSURE OF INVENTION

Technical Problem

Accordingly, the present invention has been made keeping in mind the above problems occurring in the prior art, and an object of the present invention is to provide a capacitive touch screen which can detect not only a touch location but also the intensity of touch pressure when a substance comes into contact with it even though the substance is a nonconductor, rather than detecting a basic touch location in such a way as to check variation in parasitic capacitance when touched only be a conductive substance, so that various input signals which have not been implemented in the conventional touch screen can be created using the touch location and the intensity of touch pressure.

Another object of the present invention is to provide a capacitive touch screen which almost perfectly allows passage of light from a display provided under the touch screen, thus ensuring the high visibility of images displayed on the display, and which has a simple structure, thus reducing the production cost.

Technical Solution

In order to accomplish the above objects, the present invention provides a capacitive touch screen.

A capacitive touch screen according to a first embodiment of the present invention includes a substrate, a first electrode plate, an elastic spacer, a second electrode plate and a transparent panel.

The substrate comprises a plate which is open in a central portion thereof other than a rim or comprises a transparent solid plate.

The first electrode plate is placed on the upper surface of the rim of the substrate.

The elastic spacer is placed on the upper surface of the first electrode plate and is variable in thickness in response to application of an external pressure so as to be restorable to its original shape.

The second electrode plate is placed on the upper surface of the elastic spacer.

The transparent panel is placed on the upper surface of the second electrode plate to cover the entire area of the substrate.

A capacitive touch screen according to a second embodiment of the present invention includes a substrate, a first electrode plate, an elastic spacer, a second electrode plate and a transparent panel.

The substrate comprises a plate which is open in a central portion thereof other than a rim or comprises a transparent solid plate.

The first electrode plate is placed on the upper surface of the rim of the substrate.

The elastic spacer is placed on the upper surface of the rim of the substrate and is variable in thickness in response to application of an external pressure so as to be restorable to its original shape.

The transparent panel is placed on the upper surface of the elastic spacer to cover the entire area of the substrate.

The second electrode plate is placed beneath the lower surface of the transparent panel such that the second electrode plate is spaced apart from the first electrode plate by a predetermined distance.

A capacitive touch screen according to a third embodiment of the present invention includes a substrate, a first electrode plate, first and second elastic spacers, a pair of second electrode plates and a transparent panel.

The substrate comprises a plate which is open in a central portion thereof other than a rim or comprises a transparent solid plate.

The first elastic spacer is placed on the upper surface of the rim of the substrate and is variable in thickness in response to application of an external pressure so as to be restorable to its original shape.

The first electrode plate is placed on the upper surface of the first elastic spacer.

The second elastic spacer is placed on the upper surface of the first electrode plate and is variable in thickness in response to application of external pressure so as to be restorable to its original shape.

The transparent panel is placed on the upper surface of the second elastic spacer to cover the entire area of the substrate.

The second electrode plates are respectively placed on the upper surface of the rim of the substrate and beneath the perimeter of the lower surface of the transparent panel such that the second electrode plates are spaced apart from the first electrode plate by predetermined distances.

In the first through third embodiments, at least one of the first electrode plate and the second electrode plate comprises four or more electrode plates which are arranged along the rim of the substrate at positions spaced apart from each other at predetermined intervals.

Preferably, one electrode plate of the first electrode plate and the second electrode plate comprises four or more electrode plates arranged along the rim of the substrate at positions spaced apart from each other at predetermined intervals, and the other electrode plate comprises a single electrode plate arranged over the rim along the overall length thereof.

When a contact pressure is applied to a portion of the transparent panel, a distance between the first electrode plate and the second electrode plate is restorably varied by elastic height variation of the elastic spacer or the first and second elastic spacers, so that capacitances are varied at sensing points corresponding to locations of the four or more electrode plates, and a touch location and a touch pressure are determined by variation rates of the capacitances measured at the sensing points.

Preferably, the elastic spacer comprises an elastic synthetic resin member or a spring which varies in height in response to application of an external pressure so as to be restorable, or a hinge structure having restorability to be returned to an original state thereof.

Advantageous Effects

The capacitive touch screen according to the present invention can detect not only a touch location but also the intensity of touch pressure when a substance comes into contact with it even though the substance is a nonconductor, rather than detecting only a basic touch location in such a way as to check variation in parasitic capacitance only when contact is made therewith by a conductive substance. Therefore, various input signals which have not been implemented in the conventional touch screen can be created using the touch location and the intensity of touch pressure.

Furthermore, in the capacitive touch screen of the present invention, the substrate has a structure which is open in the central portion thereof or is made of a transparent solid plate. In addition, first and second electrode plates and elastic spacers are arranged only on a rim or perimeter of the substrate, and a transparent panel is placed on them. Hence, the high visibility of images displayed on a display provided under the touch screen is ensured. As well, the capacitive touch screen of the present invention has a simple structure, thus reducing the production cost.

BEST MODE FOR CARRYING OUT THE INVENTION

Figure 1:
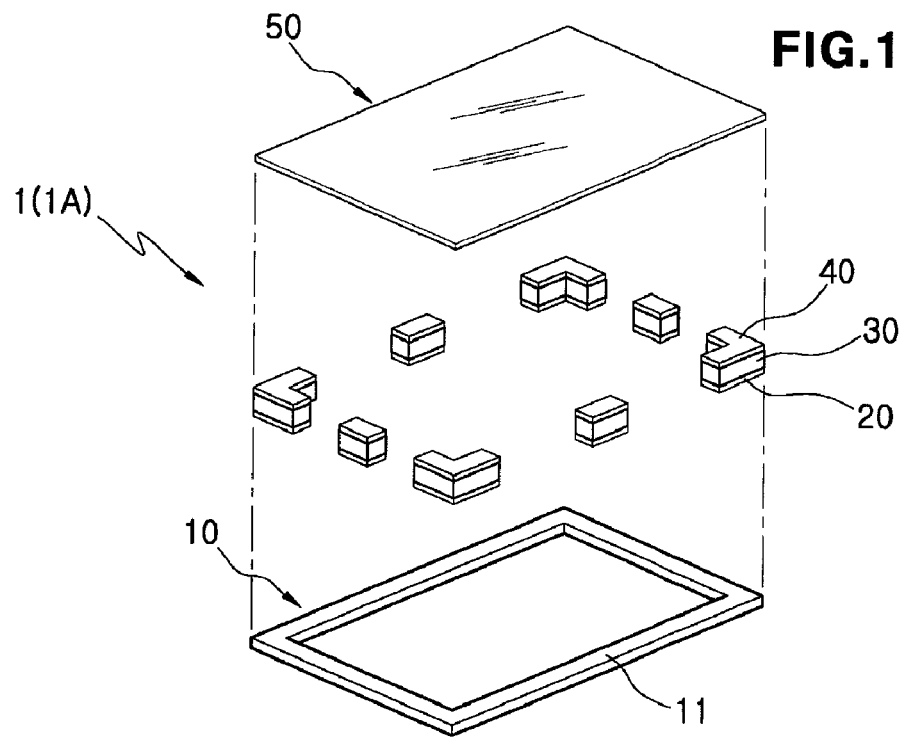
FIG. 1 is an exploded perspective view of a touch screen, according to a first embodiment of the present invention.
Figure 2:
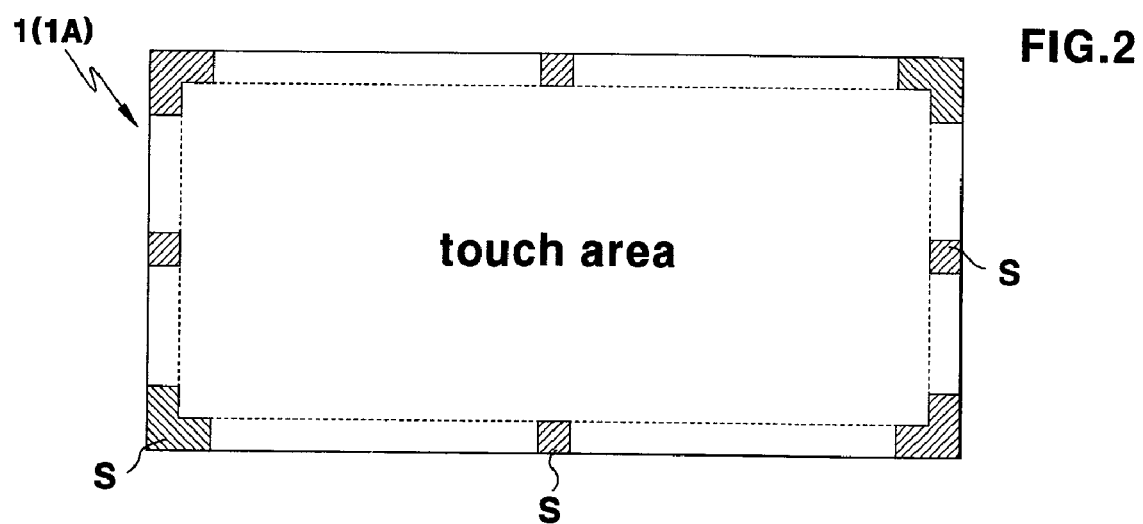
FIG. 2 is a schematic plan view of FIG. 1.

Hereinafter, a capacitive touch screen according to the present invention will be described in detail with reference to the attached drawings. The following embodiments are only illustrative examples of the capacitive touch screen of the present invention, but the scope of the present invention must not be regarded as being limited to these embodiments.

The capacitive touch screen 1 according to the present invention is used as an input unit of various electric and electronic devices, such as a navigator, an industrial terminal, a notebook computer, an automatic teller machine, a game machine, a mobile phone, an MP3 player, an PDA, an PMP, an PSP, a portable game player, a DMB receiver, a refrigerator, a microwave oven, a washing machine, etc.

As is well known, the touch screen is generally placed on a display panel which displays data. The touch screen and the display are connected through a circuit to an electric or electronic device, and they are controlled by the device and are operated as a single unit. Furthermore, the touch screen includes a sensing unit (a touch screen panel) which detects contact, and a circuit unit which generates an input signal corresponding to a variation in the rate of capacitance transmitted from the sensing unit.

The present invention pertains to the touch screen panel which functions as the sensing unit.

The circuital connection of the touch screen of the present invention to the electric or electronic device or the generation and transmission of an input signal depending on a variation in capacitance detected by the touch screen of the present invention are not directly related to the present invention, and these techniques will be understood with reference to the well known related techniques, therefore detailed explanation will be skipped.

1. First Embodiment

Hereinafter, a touch screen 1(1A) according to a first embodiment of the present invention will be described with reference to FIGS. 1 through 4.

As shown in FIGS. 1 to 4, the touch screen 1A according to the first embodiment of the present invention includes a substrate 10, first electrode plates 20, elastic spacers 30, second electrode plates 40 and a transparent panel 50.

The substrate 10 forms the basic framework of the touch screen. As shown in FIGS. 1, 3A, 3B and 3C, a substrate which is open in the central portion other than the rim 11 may be used as the substrate 10 (i.e. ring type substrate). Alternatively, as shown in FIG. 3D, a transparent solid plate having no opening may be used as the substrate 10.

The reason for the use of the substrate, which is open in the central portion thereof, or the transparent solid plate as the substrate 10 is that the light transmissivity of the display disposed below the substrate 10 can be prevented from being reduced. By virtue of the structure of the substrate 10, the visibility (transparency) of the touch screen 1A can be prevented from being reduced due to the existence of the substrate 10.

As the material of the substrate 10, a circuit board (PCT or FPCB) which is typically used in this art can be appropriately used according to the characteristics of the electric and electronic device having the touch screen of the present invention.

In the case of the shape which is open the central portion, the substrate 10 does not need to be transparent, but in the case of the solid plate, it is formed to be transparent.

The first electrode plate 20 is a planar electrode corresponding to an electrode which is disposed at one side in two electrode plates of a typical capacitive touch screen. The first electrode plate 20 is made of conductive material, such as a copper plate.

The first electrode plate 20 is placed on the upper surface of the substrate 10 along the rim 11 of the substrate 10. In other words, in the case of the ring type substrate 10, the first electrode plate 20 is attached to the upper surface of the rim 11 of the substrate 10. In the case of the transparent solid substrate 10, the first electrode plate 20 is attached to the perimeter of the substrate 10.

The elastic spacer 30 is placed on the upper surface of the corresponding first electrode plate 20 along the rim 11. The elastic spacer 30 is interposed between the corresponding first electrode plate 20 and the corresponding second electrode plate 40 and functions as a dielectric substance.

Furthermore, the elastic spacer 30 elastically varies in thickness depending on the magnitude of a touch pressure applied to the touch screen so as to elastically vary a distance 'd' between the first electrode plate 20 and the second electrode plate 40. The elastic spacer 30 restores itself to its original thickness thereafter. Thereby, capacitances at sensing points S corresponding to locations, at which the first electrode plate 20 and the second electrode plate 40 overlap with each other, vary depending on the magnitude of the touch pressure.

The material and shape of the elastic spacer 30 are not limited, so long as it can elastically vary the distance 'd' between the first electrode plate 20 and the second electrode plate 40 in a restorable manner. For example, elastic materials, such as polyolefin, PVC, polystyrene, polyester, polyurethane, polyamide, etc. which are well known, can be used as the material of the elastic spacer 30.

Particularly, as shown in FIG. 1, elastic silicone which is formed in various block shapes, such as a rectangular hexahedron, may be used as the elastic spacer 30.

The elastic spacer 30 varies and changes in thickness depending on the magnitude of touch pressure such that the distance 'd' between the first electrode plate 20 and the second electrode plate 40 changes. When the touch pressure is removed, the elastic spacer 30 returns to its original state.

Figure 7:
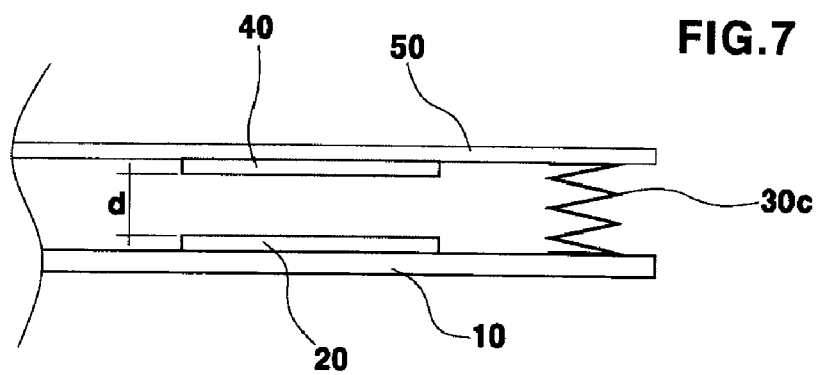
FIG. 7 is of schematic partial sectional views showing examples of an elastic spacer of a touch screen, according to another embodiment of the present invention.
Figure 7:
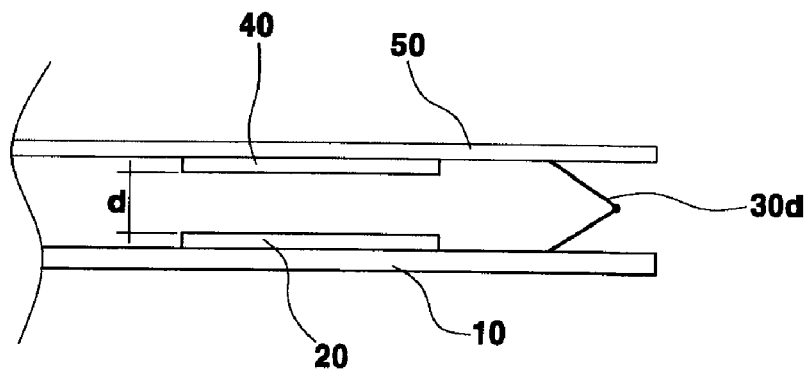

As well as the elastic synthetic resin such as the above-mentioned elastic silicone, as shown in FIG. 7, a mechanical spring (30c: although a coil spring is illustrated as being one example in the drawing, other springs including a leaf spring can be used) or a mechanical structure, such as a hinge structure 30d, which is provided with a spring to have restorative ability may be used as the elastic spacer 30.

Figure 5:
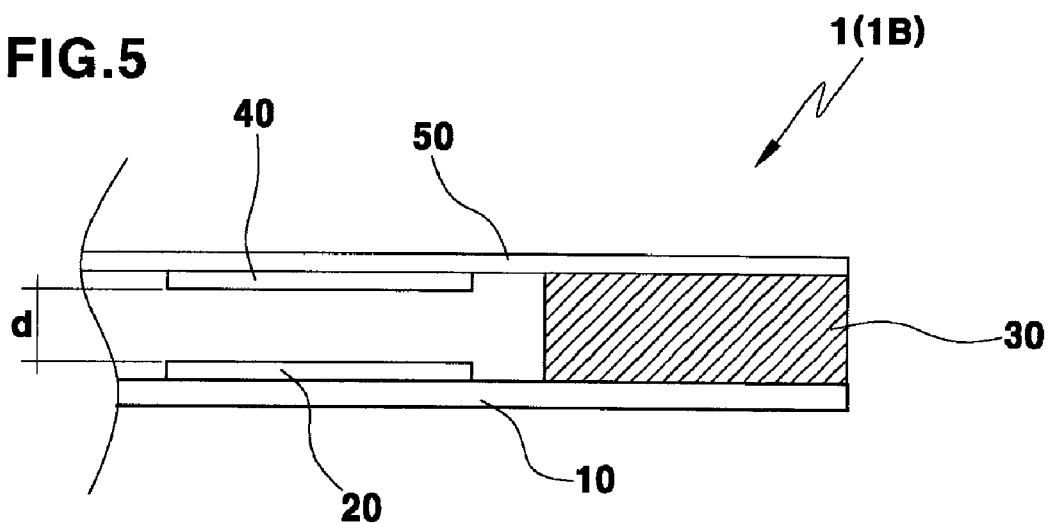
FIG. 5 is a schematic partial sectional view of a touch screen, according to a second embodiment of the present invention.

The elastic spacer 30c or 30d having the mechanically elastic structure is suitable for a touch screen 1B of a second embodiment which the elastic spacer 30 is not interposed between the electrode plates 20 and 40 and will be explained later with reference to FIG. 5, rather than being suitable for the first embodiment in which the elastic spacer 30 is interposed between the electrode plates 20 and 40 as shown in FIGS. 1 through 4.

The second electrode plate 40 is a planar electrode corresponding to an electrode which is disposed at the other side in two electrode plates of a typical capacitive touch screen.

The second electrode plate 40 is made of conductive material, for example, a copper plate, in the same manner as that of the first electrode plate 20.

The second electrode plate 40 is placed on the corresponding elastic spacer 30 along the rim 11 of the substrate 10 and is spaced apart from the corresponding first electrode plate 20 by the distance 'd' with the elastic spacer 30 interposed therebetween.

The transparent panel 50 is a planar substance which covers the overall area of the upper surface of the touch screen 1. The transparent panel 50 protects the elements including the electrode plates, transmits touch pressure to the elastic spacers 30, and is made of transparent material to allow a user to observe images displayed on the display provided on the underneath.

For example, material, such as reinforcing glass, having superior durability and transparency can be used.

As such, the first electrode plate 20 and the second electrode plate 40 overlap each other and the elastic spacer 30 is interposed therebetween. Hence, the second electrode plate 40 is spaced apart from the first electrode plate 20 by the distance 'd' corresponding to the thickness of the elastic spacer 30. The overlapped locations of the first electrode plate 20 and the second electrode plate 40 become sensing points S at which capacitance is varied by touch pressure. The rates of variation of the capacitances at the sensing points S are measured by a circuit unit.

In detail, when a portion of the transparent panel 50 is pushed, the second electrode plates 40 and the elastic spacers 30 are compressed so that the elastic spacers 30 are elastically compressed, thus varying (reducing) the distance 'd' between the first electrode plate 20 and the second electrode plate 40. Depending on variation in the distance 'd', capacitance at each sensing point S varies according to the formula of $C=\mu A/d$ (here, 'C' denotes capacitance, '$\mu$' denotes a dielectric constant, 'A' denotes an area, and 'd' denotes a distance between the electrode plates). A variation rate of capacitance varies depending on the magnitude of touch pressure.

When the touch pressure is removed, the elastic spacer 30, the second electrode plate 40 and the transparent panel 50 return to their original state because of the restoring force of the elastic spacer 30 and of their own elastic force.

Hereinafter, the number and arrangement of the first electrode plate 20, the second electrode plate 40 and the elastic spacer 30 of the touch screen 1A according to the first embodiment will be described.

Of the first electrode plate 20 and the second electrode plate 40, at least one kind of electrode plate comprises four or more electrode plates which are arranged at regular intervals along the rim 11 of the substrate 10.

In other words, as shown in FIGS. 1 and 3D, at least four pairs of the first electrode plates 20 and the second electrode plates 40 may be arranged at regular intervals along the rim 11.

Figure 3A:
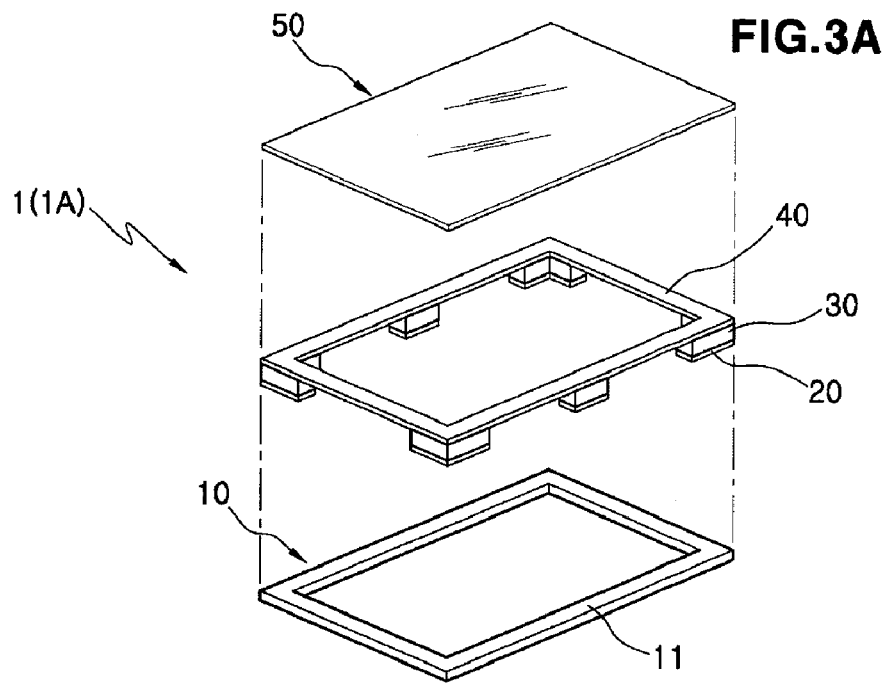
FIG. 3A is an exploded perspective view of a touch screen, according to a first embodiment of the present invention.
Figure 3B:
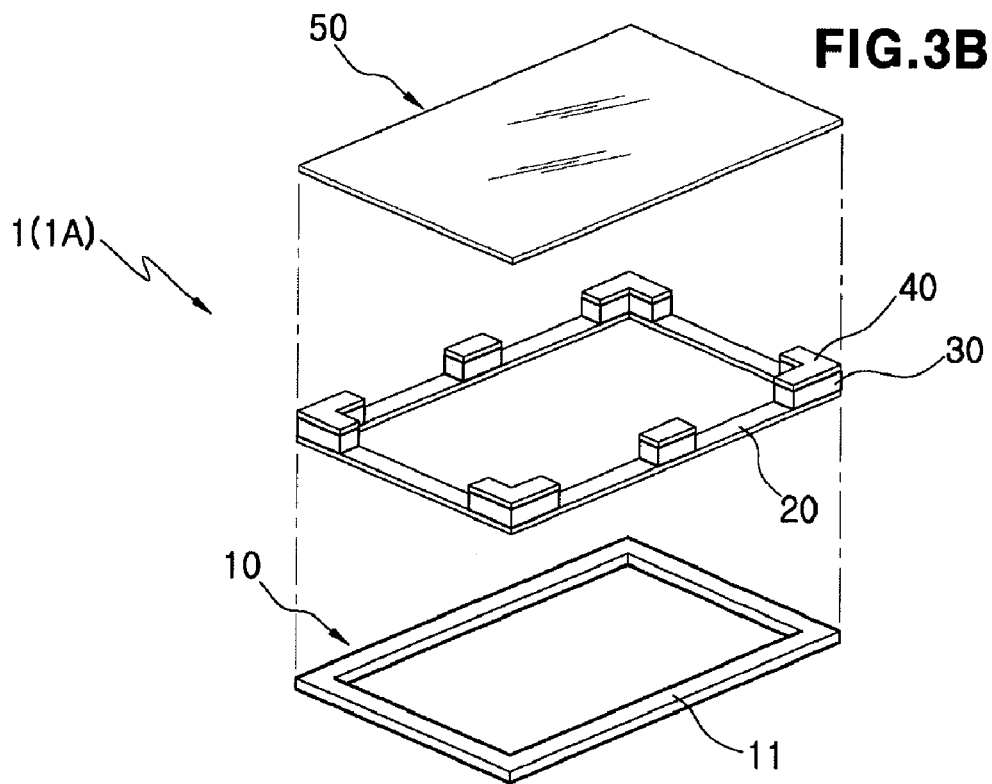
FIG. 3B is an exploded perspective view of a touch screen, according to a first embodiment of the present invention.
Figure 3C:
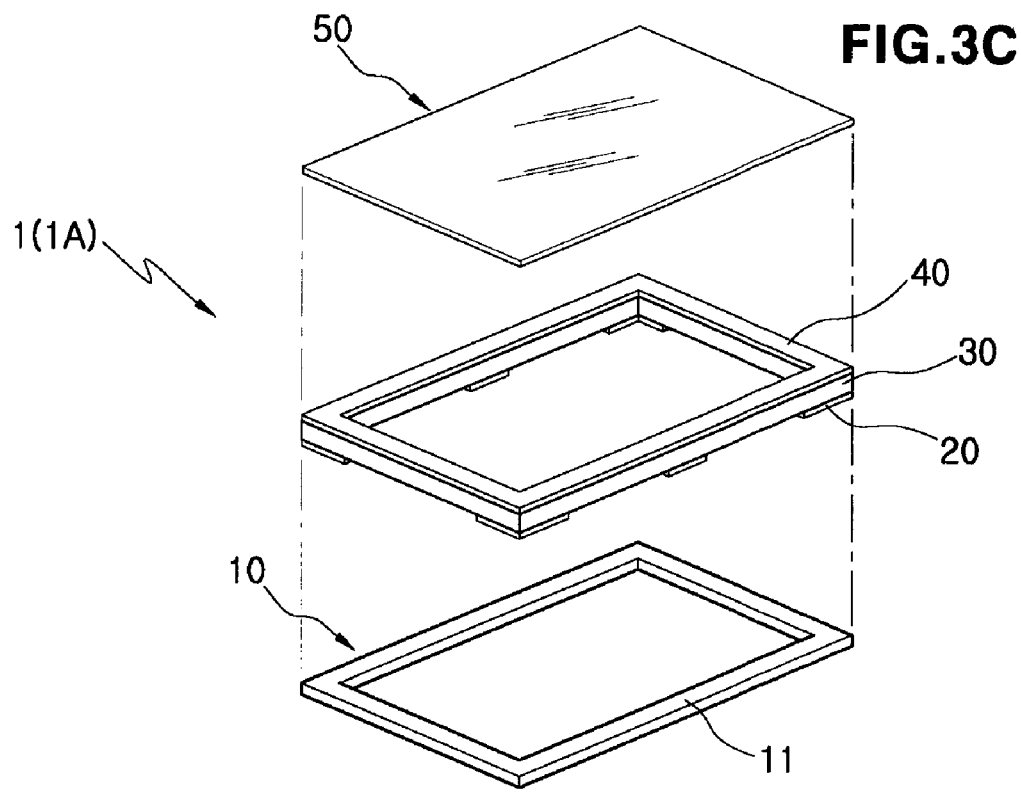
FIG. 3C is an exploded perspective view of a touch screen, according to a first embodiment of the present invention.
Figure 3D:
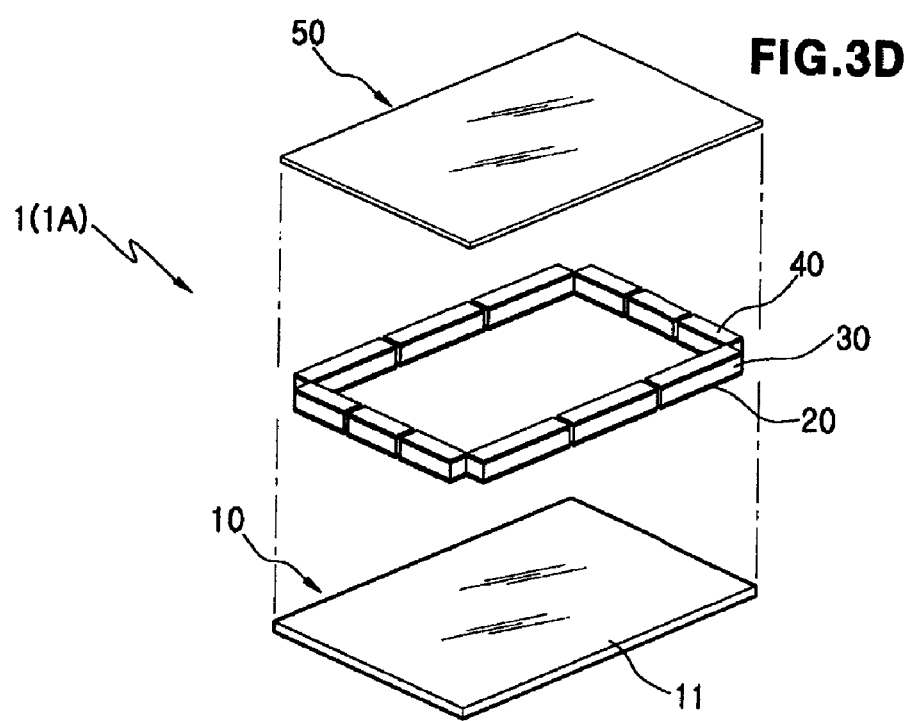
FIG. 3D is an exploded perspective view of a touch screen, according to a first embodiment of the present invention.
Figure 4:
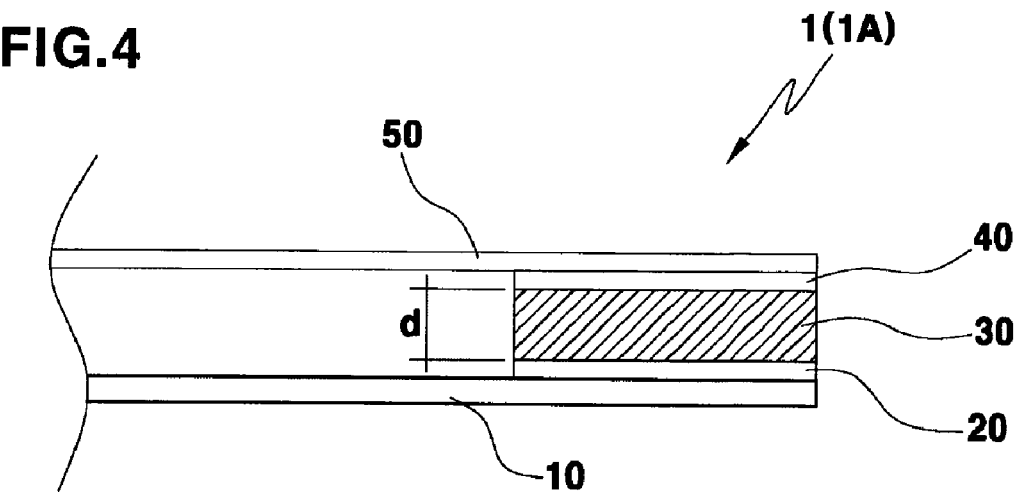
FIG. 4 is a schematic partial sectional view of FIG. 1.

Alternatively, as shown in FIGS. 3A, 3B and 3c, one kind of electrode plate 20 or 40 comprises four or more electrode plates, and the other kind of electrode plate 20 or 40 comprises a single electrode plate, which are placed on the rim 11 along the overall length thereof. Here, the single electrode plate does not need to be only a single body and, for example, it may be divided into two or three bodies.

FIGS. 1 and 3D illustrate examples in which eight pairs and twelve pairs of first electrode plates 20 and second electrode plates 40 are provided.

In the first embodiment of FIG. 1, one first electrode plate 20 and one second electrode plate 40 are disposed at each of four corners and four sides of the rim 11, so that total eight pairs of electrode plates are arranged on the rim 11.

In the first embodiment of FIG. 3D, three first electrode plate 20 and three second electrode plate 40 are disposed at each of four sides of the rim 11, so that total twelve pairs of electrode plates are arranged on the rim 11.

FIGS. 3A and 3C illustrate examples in which six first electrode plates 20 and a single second electrode plate 40 are provided.

FIG. 3B illustrates an example in which six second electrode plates 40 and a single first electrode plate 20 are provided.

In the case where the first and second electrode plates 20 and 40 are provided in a one to one coupling manner, as shown in FIGS. 1 and 3D, each pair of upper and lower electrode plates overlapping with each other forms one sensing point S.

In the case where one side electrode plate comprises a plurality of electrode plates and the other side electrode plate comprises a single electrode plate, as shown in FIGS. 3A, 3B and 3C, a location of each of the plurality of electrode plates forms one sensing point S.

The upper and lower electrode plates are connected to the circuit unit, for example, through a matrix circuit.

The reason why four or more electrode plates are arranged is that detection of a location and pressure of a touch can be exactly conducted by measuring variation rates in capacitance at four or more sensing points S at which the electrode plates are disposed.

If three or fewer electrode plates are used, a pattern of rate of variation of capacitance becomes very simplified due to an insufficient number of sensing points S, so that a location and pressure of a touch may not be exactly detected. If there are too many electrode plates, a pattern of variation rates in capacitance is very complex because of there being too large a number of sensing points S, with the result that the calculation is very complicated.

With regard to the elastic spacer 30, it is sufficient if it can elastically vary the distance between the first electrode plate 20 and the second electrode plate 40. Therefore, elastic spacers 30 may be respectively and independently placed on the four or more electrode plates 20 or 40 or, alternatively, a single elastic spacer 30 may be provided along the rim 11.

In the case of the single elastic spacer, it does not need to be only a single body and, for example, it may be divided into two or three bodies.

FIGS. 1, 3A, 3B and 3D illustrate examples in which an elastic spacer 30 is individually provided each between the electrode plates 20 and 40. FIG. 3C illustrates an example in which a single elastic spacer 30 is provided along the rim 11 of the substrate 10.

As described above, in the touch screen 1A according to the first embodiment, the substrate 10 comprises a plate which is open in the central portion thereof, or a transparent solid plate. The first and second electrode plates 20 and 40 and the elastic spacers 30 are placed only on the rim 11 of the substrate 10. The transparent panel 50 is placed at the uppermost position on top of them. Thus, a touch area is formed inside the rim 11 of the substrate (on a portion inside the dotted line of FIG. 2).

Therefore, the transparency of the touch area can be enhanced, thus allowing the user to clearly observe images displayed on the display provided under the touch screen.

2. Second Embodiment

Hereinafter, a touch screen 1(1B) according to a second embodiment of the present invention will be described with reference to FIG. 5.

In the same manner as the first embodiment, the touch screen 1B according to the second embodiment also includes a substrate 10, first electrode plates 20, elastic spacers 30, second electrode plates 40 and a transparent panel 50.

In the following description, only points of difference with the first embodiment will be explained.

In the touch screen 1A according the first embodiment, the first electrode plate 20, the elastic spacer 30 and the second electrode plate 40 which are arranged on the rim 11 of the substrate 10 are placed one on top of another in a state in which the first and second electrode plates 20 and 40 are in direct contact with the elastic spacer 30.

On the other hand, in the touch screen 1B according to the second embodiment, an elastic spacer 30 is interposed between the substrate 10 and the transparent panel 50. The first electrode plate 20 and the second electrode plate 40 which are spaced apart from each other by a predetermined distance 'd' are disposed on the rim 11 of the substrate 10 at a position away from the elastic spacer 30 and are respectively attached to the upper surface of the rim 11 of the substrate 10 and the lower surface of the transparent panel 50.

In the second embodiment, the elastic spacer 30 functions only to elastically vary the distance. Air between the upper and lower electrode plates serves as a dielectric substance.

In the second embodiment as well, the pressure exerted when a portion of the transparent panel 50 is pushed compresses the elastic spacers 30, and the distance 'd' between the first electrode plate 20 and the second electrode plate 40 which are adjacent to the elastic spacer 30 changes. Depending on the variation in the distance 'd', capacitance at each corresponding sensing point S varies.

Furthermore, of the first electrode plate 20 and the second electrode plate 40, at least one kind of electrode plate comprises four or more electrode plates which are arranged at regular intervals along the rim 11 of the substrate 10. The elastic spacer 30 may be respectively and independently placed adjacent to the four or more electrode plates 20 or 40. Alternatively, a single elastic spacer 30 may be provided along the overall length of the rim 11.

3. Third Embodiment

Hereinafter, a touch screen 1(1C) according to a second embodiment of the present invention will be described with reference to FIG. 6.

The touch screen 1C according to the third embodiment also includes a substrate 10, first electrode plate 20, elastic spacers 30, second electrode plates 40 and a transparent panel 50.

In the following description, only points of difference with the first or second embodiment will be explained.

The general construction and operation of the touch screen 1C according to the third embodiment are the same as those of the first or second embodiment. However, in the third embodiment, each elastic spacer 30 has a double structure which comprises a first elastic spacer 30a and a second elastic spacer 30b, and each second electrode plate 40 has a double structure which comprises a pair of second electrode plates which are disposed at upper and lower positions corresponding to the first and second elastic spacers 30a and 30b, unlike the first or second embodiment.

In detail, in the touch screen 1C according to the third embodiment, the first elastic spacer 30a is placed on the upper surface of the rim 11 of the substrate 10.

The first electrode plate 20 is placed on the first elastic spacer 30a. The second elastic spacer 30b is placed on the first electrode plate 20. The transparent panel 50 is placed on the second elastic spacer 30b to cover the entire area of the substrate 10.

In addition, the upper and lower second electrode plates 40 are respectively attached to the perimeter of the lower surface of the transparent panel 50 and the upper surface of the rim 11 of the substrate 10 to form a double layered structure such that they are spaced apart from the first electrode plate 20 by regular distances 'd'.

Figure 6:
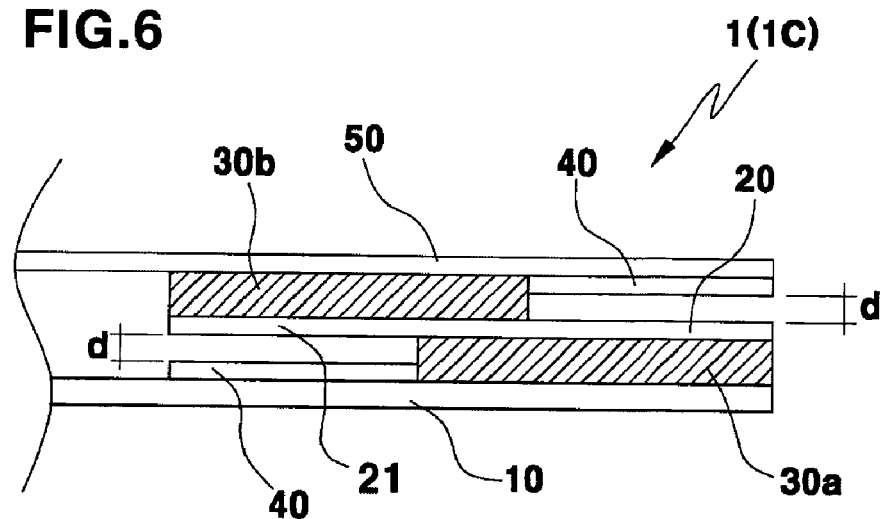
FIG. 6 is a schematic partial sectional view of a touch screen, according to a third embodiment of the present invention.

As such, in the double layered structure of the touch screen 1C shown in FIG. 6, the first electrode plate 20 which is placed on the upper surface of the first elastic spacer 30a has an area greater than that of the first elastic spacer 30a. The second elastic spacer 30b is placed on the first electrode plate 20 such that it covers an excess portion 21 of the first electrode plate 20 which protrudes outside from the first elastic spacer 30a.

Furthermore, the upper and lower second electrode plates 40 are attached to the lower surface of the transparent panel 50 and the upper surface of the rim 11 of the substrate 10.

Although this double layered structure is illustrated as one example in FIG. 6, the touch screen 1C may have a double layered structure in which the lower second electrode plate 40 is placed on the rim 11 of the substrate, and then the first elastic spacer 30a, the first electrode plate 20, the second elastic spacer 30b, the upper second electrode plate 40 and the transparent panel 50 are stacked on the lower second electrode plate 40 in order from bottom to top.

In even the third embodiment as well, the touch pressure exerted when a portion of the transparent panel 50 is pushed compresses the elastic spacers 30a and 30b, so that the distances 'd' between the upper and lower second electrode plates 40 and the first electrode plate 20 interposed between the elastic spacers 30a and 30b are varied (i.e., reduced). Depending on the variation in the distances 'd', capacitance at each corresponding sensing point S varies.

As well, of the first electrode plate 20 and the second electrode plate 40, at least one kind of electrode plate comprises four or more electrode plates which are arranged at regular intervals along the rim 11 of the substrate 10.

The elastic spacers 30a and 30b may be independently placed on or around each of the four or more electrode plates 20 or 40. Alternatively, single elastic spacers 30a and 30b may be provided along the overall length of the rim 11 of the substrate 10.

The touch screen 1C according to the third embodiment having the double layered structure is advantageous in that two variation rates in capacitance can be measured at each sensing point S, thus increasing detection sensitivity.

4. Obtainment of Touch Location and Magnitude of Touch Pressure

Hereinafter, the principle of obtaining a touch location and the magnitude of touch pressure in the touch screen 1 of the present invention will be explained with reference to FIGS. 8 and 9.

Figure 8:
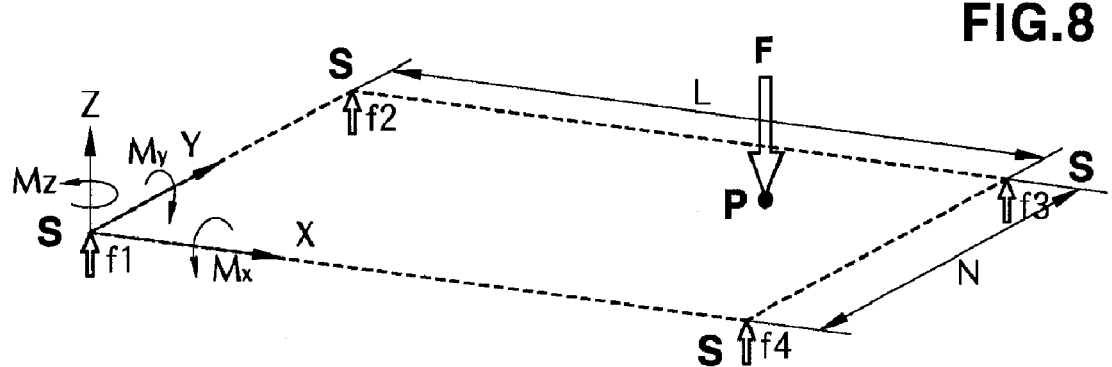
FIGS. 8 and 9 are views illustrating the principle of determining a touch location and detecting a touch pressure on the touch screen according to the present invention.

FIG. 8 shows an example of the touch screen in which the first electrode plate 20, the elastic spacer 30 and the second electrode plate 40 are stacked on each of the four corners of the rim 11 of the substrate 10 to form four sensing points S on the four corners of the rim 11.

Figure 9:
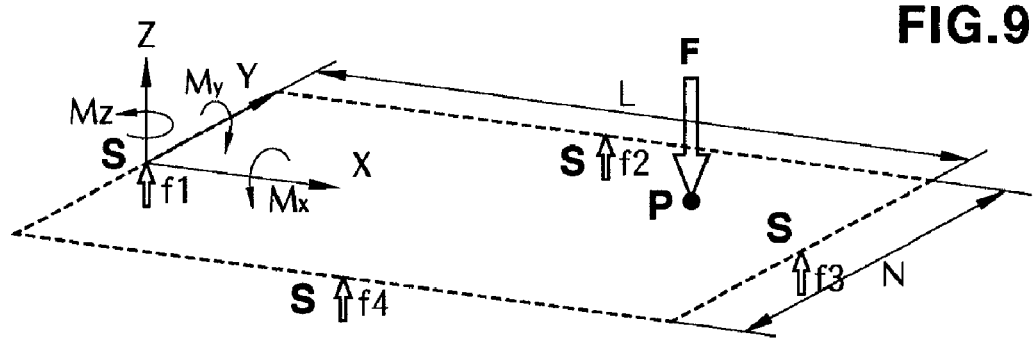

FIG. 9 shows an example of the touch screen in which the first electrode plate 20, the elastic spacer 30 and the second electrode plate 40 are stacked at a medial position on each of the four sides of the rim 11 of the substrate 10 to form four sensing points S on the four sides of the rim 11.

In FIGS. 8 and 9, the character 'F' denotes the magnitude of a force applied to a touch point 'P'. The characters 'L' and 'N' denote horizontal and vertical lengths of the touch screen 1. The characters 'f1, f2, f3 and f4' denote intensities of forces measured at the sensing points S when a force F is applied to a touch point P.

In FIG. 8, the bottom left hand corner is set as the origin of the coordinate axes. In FIG. 9, the center of the left side is set as the origin of the coordinate axes.

According to Newton's laws of force, the sum of vectors of all forces applied to a rigid body and the sum of vectors of moments M applied thereto are zero. Hence, when a force F is applied to the touch screen 1, because the touch screen does not substantially move or rotate, $\Sigma F$ and $\Sigma M$ are zero.

In the case of the coordinate axes shown in FIG. 8, the sum of all forces F is zero, and because there is no force with respect to the direction of the X-axis or Y-axis, the equations $\Sigma Fx=0$ and $\Sigma Fy=0$ are satisfied. Because the magnitude of a force F applied in the direction of the Z-axis is equal to the sum of the intensities of the opposing forces f1, f2, f3 and f4 measured at the sensing points S, $F=f1+f2+f3+f4$ (equation 1) is obtained from the equation $\Sigma Fz=0$.

Furthermore, based on the fact that the sum of all moments is zero, there is no moment with respect to the Z-axis, so that $\Sigma Mz=0$ is satisfied.

With regard to moments relative to the X-axis, because forces f2 and f3 are applied in counterclockwise directions at positions spaced apart from the X-axis by the distance N, moments having magnitude of $N \cdot f2$ and $N \cdot f3$ are applied to the X-axis in counterclockwise directions. In addition, because a force F is applied in a clockwise direction at a position spaced apart from the X-axis by the distance y, a moment having magnitude of $y \cdot F$ is applied to the X-axis in a clockwise direction.

Hence, from $\Sigma Mx=0$, $-y \cdot F+N \cdot f2+N \cdot f3=0$ is satisfied.

As a result, $y=N(f2+f3)/F$ (equation 2) is obtained.

With regard to moments relative to the Y-axis, because forces f3 and f4 are applied in counterclockwise directions at positions spaced apart from the Y-axis by the distance L, moments having magnitude of $L \cdot f3$ and $L \cdot f4$ are applied to the Y-axis in counterclockwise directions. In addition, because the force F is applied in a clockwise direction at a position spaced apart from the X-axis by the distance y, a moment having magnitude of $x \cdot F$ is applied to the Y-axis in a clockwise direction.

Hence, from $\Sigma My=0$, $x \cdot F-L \cdot f3-L \cdot f4=0$ is satisfied.

As a result, $x=L(f3+f4)/F$ (equation 3) is obtained.

Therefore, if forces f1, f2, f3 and f4 measured at the sensing points S are determined, magnitude of a touch pressure can be obtained from the equation 1 and coordinates thereof can be obtained from the equations 2 and 3.

In the case where the coordinate axes are set as shown in FIG. 9, if the same conditions as that of FIG. 8 are given, there is no force with respect to the direction of the X-axis or Y-axis, and $F=f1+f2+f3+f4$ (equation 4) is obtained from $\Sigma Fz=0$.

Furthermore, from the fact that the sum of all moments is zero, there is no moment with respect to the Z-axis, so that $\Sigma Mz=0$ is satisfied.

With regard to moments relative to the X-axis, because a force f2 is applied in a counterclockwise direction at a position spaced apart from the X-axis by the distance N/2, a moment having magnitude of $N \cdot f2/2$ is applied to the X-axis in a counterclockwise direction. In addition, because a force f4 is applied in a clockwise direction at a position spaced apart from the X axis by the distance N/2, a moment having magnitude of $N \cdot f4/2$ is applied to the X-axis in a clockwise direction. Furthermore, a force F is applied downwards at a position spaced apart from the X-axis by the distance y, so that a moment having magnitude of $y \cdot F$ is applied to the X-axis in a clockwise direction. Because f1 and f3 are present on the X-axis, f1 or f3 does not generate a moment relative to the X-axis.

Therefore, from $\Sigma Mx=0$, $-y \cdot F+N \cdot f2/2-N \cdot f4/2=0$ is satisfied.

Ultimately, $y=N \cdot (f2-f4)/2F$ (equation 5) is obtained.

In the same manner, with regard to moments relative to the Y-axis, because the forces f2 and f4 are applied in counterclockwise directions at positions spaced apart from the Y-axis by the distance L/2, moments having magnitude of $L \cdot f2/2$ and $L \cdot f4/2$ are applied to the Y-axis in counterclockwise directions.

Furthermore, because the force f3 is applied in a counterclockwise direction at a position spaced apart from the Y-axis by the distance L, a moment having magnitude of $L \cdot f3$ is applied to the Y-axis in a counterclockwise direction. In addition, the force F is applied downwards at a position spaced apart from the Y-axis by the distance x, so that a moment having the magnitude of $x \cdot F$ is applied to the Y-axis in a clockwise direction.

Therefore, from $\Sigma My=0$, $x \cdot F-L \cdot f2/2-L \cdot f4/2-L \cdot f3=0$ is satisfied.

Ultimately, $x=L(f2+2f3+f4)/2F$ (equation 6) is obtained.

Therefore, in the same manner as the case of FIG. 8, if forces f1, f2, f3 and f4 measured at the sensing points S are determined, a magnitude of a touch pressure can be obtained from the equation 4 and coordinates thereof can be obtained from the equations 5 and 6.

In the example of FIG. 8 or 9, although the origin of the coordinate axes is set at any location, the above-mentioned calculation principle can be used. The result obtained from the coordinate axes set by the above method can be applied through coordinate transformation to other coordinate axes selected by the user.

Furthermore, although FIGS. 8 and 9 illustrate the case having four sensing points, in even the case where the number of sensing points is greater than four, a touch location and the magnitude of touch pressure can be calculated by the same principle.

As described above, when a force F having a predetermined magnitude is applied to a touch point P, variation rates in capacitances at the sensing points S are measured. The variation rates in capacitances vary depending on a touch location and the magnitude of touch pressure. From the relationship equations with respect to the variation rates of the capacitances, the touch location and the magnitude of touch pressure, the coordinates of the touch location and the magnitude of touch pressure can be obtained.

Data about a touch location and the magnitude of touch pressure, obtained by the touch screen 1 of the present invention, can be effectively used as input signals of various devices. Particularly, unlike the conventional capacitive touch screen which cannot determine the magnitude of touch pressure, if the touch screen 1 of the present invention is connected to software which requires the determination of the magnitude of touch pressure, various input signals which could not be implemented in the conventional touch screen can be created.

As one example of the application of the touch screen of the present invention, in the conventional technique, to conduct acceleration of a scrolling function of an MP3 player to select a program, an input signal of an acceleration key must be generated in such a way as to measure the time for which a scroll bar is continuously pushed. However, in the present invention which can measure the intensity of touch pressure, an input signal of an acceleration key can be generated depending on the intensity of pressure pushing against the touch screen.

As another example in which the touch screen of the present invention is applied to various kinds of game programs, the present invention can be used in a game program which must simulate physical force depending on the intensity of touch pressure or must control the force or express the degree of variation in force. For example, in the case of a fighting game, the intensity of striking impact can vary depending on the intensity of touch pressure. In the case of a golf game, the intensity at which a ball is struck can be controlled in proportion to the intensity of touch pressure.

As well, in a sports game, the jumping motion of a character, for example, the height of jumping motion, can be varied by the intensity of touch pressure to increase the sensation of reality. As yet another example, in the conventional touch screen, one key has only one or two functions in a manner similar to that of a keypad of a typical mobile phone. However, in the present invention, one key can create various input signals depending on the intensity with which the user pushes the key. For example, a mobile phone having the touch screen of the present invention can be designed such that a digit key can have functions of inputting not only numerals but also other various operations depending on the intensity with which the key is pushed.

Although the touch screen 1 of the present invention has been illustrated as having a general rectangular shape, it may have other shapes, for example, a circular shape, etc.

The invention claimed is:

1. A capacitive touch screen, comprising:
a substrate (10) comprising a plate which is open in a central portion thereof other than a rim (11) or comprising a transparent solid plate;
a first electrode plate (20) placed on an upper surface of the rim (11) of the substrate (10);
an elastic spacer (30) placed on an upper surface of the first electrode plate (20), the elastic spacer (30) being variable in thickness in response to application of an external pressure so as to be restorable to original shape thereof;
a second electrode plate (40) placed on an upper surface of the elastic spacer (30); and
a transparent panel (50) placed on an upper surface of the second electrode plate (40) to cover an entire area of the substrate (10);
wherein one electrode plate of the first electrode plate (20) and the second electrode plate (40) comprises four or more electrode plates arranged along the rim (11) of the substrate (10) at positions spaced apart from each other at predetermined intervals, the other electrode plate comprises a single electrode plate arranged over the rim (11) along the overall length thereof; and
when a contact pressure is applied to a portion of the transparent panel (50), a distance (d) between the first electrode plate (20) and the second electrode plate (40) is restorably varied by elastic height variation of the elastic spacer (30), so that capacitances are varied at sensing points (S) corresponding to locations of the four or more electrode plates (20) or (40), and a touch location and a touch pressure are determined by variation rates of the capacitances measured at the sensing points (S).

2. A capacitive touch screen, comprising:
a substrate (10) comprising a plate which is open in a central portion thereof other than a rim (11) or comprising a transparent solid plate;
a first electrode plate (20) placed on an upper surface of the rim (11) of the substrate (10);
an elastic spacer (30) placed on the upper surface of the rim (11) of the substrate (10), the elastic spacer (30) being variable in thickness in response to application of an external pressure so as to be restorable to original shape thereof;
a transparent panel (50) placed on an upper surface of the elastic spacer (30) to cover an entire area of the substrate (10); and
a second electrode plate (40) placed beneath a lower surface of the transparent panel (50) such that the second electrode plate (40) is spaced apart from the first electrode plate (20) by a predetermined distance;
wherein one electrode plate of the first electrode plate (20) and the second electrode plate (40) comprises four or more electrode plates arranged along the rim (11) of the substrate (10) at positions spaced apart from each other at predetermined intervals, the other electrode plate comprises a single electrode plate arranged over the rim (11) along the overall length thereof; and
when a contact pressure is applied to a portion of the transparent panel (50), a distance (d) between the first electrode plate (20) and the second electrode plate (40) is restorably varied by elastic height variation of the elastic spacer (30), so that capacitances are varied at sensing points (S) corresponding to locations of the four or more electrode plates (20) or (40), and a touch location and a touch pressure are determined by variation rates of the capacitances measured at the sensing points (S).

3. A capacitive touch screen, comprising:
a substrate (10) comprising a plate which is open in a central portion thereof other than a rim (11) or comprising a transparent solid plate;
a first elastic spacer (30a) placed on an upper surface of the rim (11) of the substrate (10), the first elastic spacer (30a) being variable in thickness in response to application of an external pressure so as to be restorable to original shape thereof;
a first electrode plate (20) placed on an upper surface of the first elastic spacer (30a);
a second elastic spacer (30b) placed on an upper surface of the first electrode plate (20), the second elastic spacer (30b) being variable in thickness in response to application of external pressure so as to be restorable to original shape thereof;
a transparent panel (50) placed on an upper surface of the second elastic spacer (30b) to cover an entire area of the substrate (10); and
a pair of second electrode plates (40) respectively placed on the upper surface of the rim (11) of the substrate (10) and beneath a perimeter of a lower surface of the transparent panel (50) such that the second electrode plates (40) are spaced apart from the first electrode plate (20) by predetermined distances;
wherein one electrode plate of the first electrode plate (20) and the second electrode plate (40) comprises four or more electrode plates arranged along the rim (11) of the substrate (10) at positions spaced apart from each other at predetermined intervals, and the other electrode plate comprises a single electrode plate arranged over the rim (11) along the overall length thereof; and
when a contact pressure is applied to a portion of the transparent panel (50), a distance (d) between the first electrode plate (20) and the second electrode plate (40) is restorably varied by elastic height variation of the elastic spacers (30a) and (30b), so that capacitances are varied at sensing points (S) corresponding to locations of the four or more electrode plates (20) or (40), and a touch location and a touch pressure are determined by variation rates of the capacitances measured at the sensing points (S).

4. The capacitive touch screen according to claim 1, wherein the elastic spacer (30) comprises an elastic synthetic resin member or a spring (30c) which varies in height in response to application of an external pressure so as to be restorable, or a hinge structure (30d) having restorability to be returned to an original state thereof.

5. The capacitive touch screen according to claim 2, wherein the elastic spacer (30) comprises an elastic synthetic resin member or a spring (30c) which varies in height in response to application of an external pressure so as to be restorable, or a hinge structure (30d) having restorability to be returned to an original state thereof.

6. The capacitive touch screen according to claim 3, wherein the elastic spacer (30) comprises an elastic synthetic resin member or a spring (30c) which varies in height in response to application of an external pressure so as to be restorable, or a hinge structure (30d) having restorability to be returned to an original state thereof.

* * * * *